United States Patent Office 3,115,406
Patented Dec. 24, 1963

3,115,406
LOW ALLOY STEEL WELDING WIRE
John T. Ballass and Bernard J. Freedman, Groton, Conn., assignors to General Dynamics Corporation, New York, N.Y., a corporation of Delaware
No Drawing. Filed Oct. 21, 1960, Ser. No. 63,971
8 Claims. (Cl. 75—124)

This invention relates to low alloy steel welding wire for use in welding low alloy high strength steel members.

This application is a continuation-in-part of our copending application Serial No. 850,107, filed November 2, 1959.

A number of low alloy nickel-bearing high tensile strength steels with many excellent characteristics have been developed for use both as armor plate and in the construction of units such as naval vessels and the like which are subject to unusually heavy stresses. Such armor-type steels have been welded either manually by the stick electrode process or automatically by the shielded inert gas welding process using commercially available weld wire. However, attempts to use conventional weld wire to weld these armor-type steels with a more economical and practical arc welding process, namely the submerged arc welding process which uses a granular flux in conjunction with a welding wire to effect the weld, provided welds that became brittle and could not withstand high impact stresses at low temperatures.

Moreover, known welding alloys for high strength steels did not respond satisfactorily to heat treatment of the welded members for stress relief or other purposes, an important factor when the welded plates must withstand heavy impacts under extremely low temperature conditions.

The present invention relates to a low alloy steel welding wire having properties particularly useful in the welding of high strength low alloy steels. Weldments produced economically by the inventive welding wire combine properties never before attained of high strength and superior impact resistance at all temperatures normally encountered including extremely low temperatures. Moreover, weldments formed by the inventive alloy welding wire may be stress relieved by heat treatment or subjected to other heat treatments without impairing their desirable properties.

HY-80 steel, which is an exemplary high strength low alloy steel having a yield strength between 80,000 and 100,000 p.s.i., has the following chemical composition.

| Element: | Percentage by weight |
|---|---|
| Carbon | .22 max. |
| Manganese | .1 to .4 |
| Phosphorus | .035 max. |
| Sulphur | .04 max. |
| Silicon | .15 to .35 |
| Nickel | 2 to 2.75 |
| Chromium | .9 to 1.4 |
| Molybdenum | .23 to .35 |

The complete specifications of HY-80 steel may be found in U.S. Government Specification MIL-S-16216D (Navy). Other typical high strength low alloy steels that may be welded advantageously by the inventive alloy welding wire include STS steel and T-steel, the latter being designated by U.S. Steel as plate steel T-1. These and other low alloy high strength steels typically contain .15 to .3% carbon and 2 to 5% of other alloying elements.

It has been found that a welding wire incorporating significant amounts of manganese, silicon, nickel, molybdenum, and copper produces weldments of the low alloy high strength steels having characteristics of high impact resistance at all temperatures and great strength. At the same time, it has been found essential to reduce certain of the residual elements ordinarily present in steel to lower percentages of the welding wire than previously thought necessary to secure a welding wire providing the favorable weld characteristics desired.

It was also discovered that the weldment must be degasified by a deoxidizing agent in the welding wire. Zirconium, aluminum and titanium have been found to be excellent deoxidizing agents alone or in combination. Other reactive metals having a high affinity for oxygen such as magnesium and calcium may also be used alone or in combination in the welding wire to degasify the weld metal.

The inventive low alloy welding wire to weld low alloy high strength steel plates contains by percent weight analysis about .15 maximum carbon, 1.2 to 1.8 manganese, .8 maximum silicon, .5 to 1.2 nickel, .1 to .5 molybdenum, .4 to 1 copper, a deoxidizing agent consisting of .03 to .5 zirconium, titanium, magnesium or calcium alone or in combination not to exceed .5, or .03 to .1 aluminum alone or in combination with zirconium, titanium, magnesium and calcium, such combined amount not to exceed .5, and the remainder essentially iron. The welding wire may also be coated with a flash coating of copper to inhibit oxidation. The copper coating is preferably not more than about .3 percent by weight of the wire and must be taken into account in determining the amount of copper in the alloy. In general the total amount of copper in the wire and in the coating should not be in excess of about 1.2 percent by weight. It has been found that the amount of copper specified herein improves the notch toughness of the welded metal.

Residual elements ordinarily found in steel must, in the inventive welding wire alloy, be reduced to very low percentages. By percent weight analysis the residual elements must not comprise more than about .015 maximum phosphorus, .015 maximum sulphur and .15 maximum chromium.

It has been found that the percentages of residual elements in the low alloy welding wire must be maintained at or below the given figures by careful refining practices to obtain wire that provides high strength welds consistently. In particular, the inventive low alloy steel wire may be refined by conventional steel making processes which provide well refined clean metal. For example, the steel may be arc melted and readled to adjust the chemistry of the composition and remove undesirable elements and compounds. Such refining of the steel may be done under vacuum degassing conditions. In any refining process used to produce the steel, optimum cleanliness must be observed in order to maintain the residual elements at a low level in the composition. Moreover, the melt must be fully killed by the addition of a deoxidizing agent such as aluminum, zirconium or titanium. The deoxidizing metal used to kill the melt may be excessive in quantity, or an additional amount may be added to the melt after it has been killed, to insure that the proper percentage of a deoxidizing agent is contained in the welding wire to degasify the weld metal.

After refining, the alloy can be cast, wrought, forged or extruded into any desired form or shape for use as welding wire, and it is then preferably flashed with a thin copper coating to resist oxidation.

The weld metal in typical weldments of low alloy high strength steels produced by the inventive welding wire, as set forth above, and deposited by arc welding techniques, exhibited the following range of properties:

| | | |
|---|---|---|
| Ultimate tensile strength | p.s.i. | 100,375 to 116,500. |
| Yield strength (.2% offset) | p.s.i. | 80,000 to 96,000. |
| Elongation percent in 1.4 inches | percent | 17.8 to 23.5. |
| Reduction in area | do | 48 to 58.9. |

Charpy V-notch toughness at
−100° F_____foot lbs__ 17 to 30.
Full size standard ASTM Charpy bar.

The foregoing properties of weldments in low alloy high strength steels are superior to any previously known. The especially favorable notch toughness properties at −100° F. of 17 to 30 foot pounds indicates that the weld metal deposited exhibits far greater resistance to high impact stresses than has been achieved heretofore.

The composition of an exemplary low alloy steel welding wire together with an analysis of the weld metal deposited from such welding wire and the properties of the weld metal both before and after stress relieveing of the weld metal follows.

EXAMPLE 1

| Element: | Percent weight analysis |
|---|---|
| Carbon | 0.09. |
| Manganese | 1.63. |
| Phosphorus | 0.008. |
| Sulphur | 0.005. |
| Silicon | 0.06. |
| Nickel | 0.87. |
| Chromium | 0.037. |
| Molybdenum | 0.2. |
| Copper | 0.55+0.36 in coating on wire. |
| Zirconium | 0.22. |
| Iron | Remainder. |

A standard butt weld on HY–80 steel plate 1 inch thick was made by depositing the above welding wire 5/32 inch in diameter using the submerged arc process. A commercial neutral flux of Grade 80, obtainable from Linde Air Products, having a mesh size of 12 by 65 was used with a heat input of 40,500 joules per inch. An analysis of the deposited weld metal follows.

| Element: | Percent weight analysis |
|---|---|
| Carbon | 0.057 |
| Manganese | 1.44 |
| Phosphorus | 0.013 |
| Sulphur | 0.010 |
| Silicon | 0.28 |
| Nickel | 1.01 |
| Chromium | 0.18 |
| Molybdenum | 0.19 |
| Copper | 0.75 |
| Zirconium | Unmeasurable |
| Iron | Remainder |

The following properties of the deposited weld metal were found:

Ultimate tensile strength_____p.s.i__ 107,000
Yield strength (.2% offset)_____p.s.i__ 82,200
Elongation percent in 1.4 inches_____percent__ 20
Reduction in area_____do____ 52.3
Hardness—Vickers No_____ 247
Charpy V-notch toughness at
−100° F_____foot pounds__ 22
Full size standard ASTM Charpy bar.

The weldment was then stress relieved by heating to 1,200° F. for one hour after which the following strength properties were found:

Ultimate tensile strength_____p.s.i__ 94,000
Yield strength (.2% offset)_____p.s.i__ 88,000
Elongation percent in 1.4 inches_____percent__ 24.3
Reduction in area_____do____ 65.5
Hardness—Vickers No_____ 213
Charpy V-notch toughness at
−100° F_____foot pounds__ 23
Full size standard ASTM Charpy bar.

Another low alloy steel welding wire in accordance with the invention has the following composition.

EXAMPLE 2

| Element: | Percent weight analysis |
|---|---|
| Carbon | .096. |
| Manganese | 1.54. |
| Phosphorus | 0.015. |
| Sulphur | 0.002. |
| Silicon | 0.06. |
| Nickel | 0.86. |
| Chromium | 0.03. |
| Molybdenum | 0.19. |
| Copper | 0.53+0.07 in coating on wire. |
| Zirconium | 0.18. |
| Iron | Remainder. |

A one inch plate of HY–80 steel was welded with a 5/32 inch diameter wire of this steel under the same conditions set forth in Example 1 to provide weld metal having the following composition.

| Element: | Percent weight analysis |
|---|---|
| Carbon | 0.065 |
| Manganese | 1.30 |
| Phosphorus | 0.024 |
| Sulphur | 0.005 |
| Silicon | 0.31 |
| Nickel | 1.2 |
| Chromium | 0.31 |
| Molybdenum | 0.22 |
| Copper | 0.57 |
| Zirconium | Unmeasurable |
| Iron | Remainder |

The strength properties of the weld metal were as follows:

Ultimate tensile strength_____p.s.i__ 103,500
Yield strength (.2% offset)_____p.s.i__ 90,000
Elongation percent in 1.4 inches_____percent__ 24.3
Reduction in area_____do____ 58.7
Hardness—Vickers No_____ 248
Charpy V-notch toughness at
−100° F_____foot pounds__ 24
Full size standard ASTM Charpy bar.

Another exemplary low alloy steel welding wire had the following composition.

EXAMPLE 3

| Element: | Percent weight Analysis |
|---|---|
| Carbon | 0.09. |
| Manganese | 1.57. |
| Phosphorus | 0.006. |
| Sulphur | 0.005. |
| Silicon | 0.07. |
| Nickel | 0.88. |
| Chromium | 0.033. |
| Molybdenum | 0.20. |
| Copper | 0.55+0.21 in coating on wire. |
| Zirconium | 0.24. |
| Iron | Remainder. |

A one inch plate of HY–80 steel was welded using a 5/32 inch diameter welding wire of the above composition in the submerged arc process with Grade 80 neutral flux and a heat input of 52,900 joules per inch. The following weld metal was produced.

| Element: | Percent weight Analysis |
|---|---|
| Carbon | 0.067 |
| Manganese | 1.46 |
| Phosphorus | 0.009 |
| Sulphur | 0.011 |
| Silicon | 0.40 |
| Nickel | 1.09 |
| Chromium | 0.20 |
| Molybdenum | 0.20 |

| Element: | Percent weight Analysis |
|---|---|
| Copper | 0.59 |
| Zirconium | 0.03 |
| Iron | Remainder |

The strength properties of the weld metal were found to be as follows:

| | |
|---|---|
| Ultimate tensile strength_____p.s.i__ | 109,000 |
| Yield strength (.2% offset)_____p.s.i__ | 82,200 |
| Elongation percent in 1.4 inches_____percent__ | 20 |
| Reduction in area_____do____ | 49.1 |
| Hardness—Vickers No_____ | 240 |
| Charpy V-notch toughness at −100° F_____foot pounds__ | 22 |

Full size standard ASTM Charpy bar.

Further exemplary low alloy steel welding wires, Examples 4 to 8, in accordance with the invention are set forth in Table 1. Melts from which wires Examples 4 and 5 were formed were aluminum killed, wire Example 6 was killed with a combination of aluminum and zirconium, wire Example 7 was zirconium killed and wire Example 8 was titanium killed.

*Table 1*

ANALYSIS OF WELDING WIRE IN PERCENTAGE BY WEIGHT

| Wire example | C | Mn | P | Si | S | Ni | Cr | Mo | Cu | Zr | Al | Ti | Fe |
|---|---|---|---|---|---|---|---|---|---|---|---|---|---|
| 4 | .07 | 1.54 | .007 | .19 | .005 | .90 | .10 | .18 | .82 | .19 | .01 | | Remainder. |
| 5 | .10 | 1.62 | .012 | .47 | .005 | .87 | .11 | .18 | .85 | <.01 | .05 | | Do. |
| 6 | .06 | 1.54 | .006 | .27 | .007 | .83 | .10 | .18 | .80 | <.01 | .038 | | Do. |
| 7 | .06 | 1.71 | .012 | .10 | .005 | .89 | .07 | .24 | .85 | .54 | .07 | | Do. |
| 8 | .08 | 1.35 | .014 | .18 | .005 | .81 | .12 | .18 | .82 | <.01 | | .051 | Do. |

Table 2 shows analyses of weld metal produced by welding plates of HY-80 steel two inches thick with welding wires Examples 4 to 8. All welds were made using welding wire electrodes 5/32 inch in diameter by the submerged arc process, the flux used having a mesh size of 10 by 40 and having a composition described and claimed in our copending application Serial No. 47,369, filed August 4, 1960, for "Welding Flux." With welding wire Examples 4, 5 and 6, the welds were made using a heat input of about 78,750 joules per inch provided by direct current reverse polarity arc current of 700 amperes (arc voltage of 30 volts) with the electrode moving along the weld joint about 16 inches per minute. With welding wire Examples 7 and 8, the welds were made using a heat input of about 60,000 joules per inch provided by direct current reverse polarity arc current of 600 amperes (arc voltage of 30 volts) with the electrode moving along the weld joint about 18 inches per minute.

*Table 2*

ANALYSIS OF WELD METAL IN PERCENTAGE BY WEIGHT

| Wire Example | C | Mn | P | Si | S | Ni | Cr | Mo | Cu | Zr | Ti | Fe |
|---|---|---|---|---|---|---|---|---|---|---|---|---|
| 4 | .07 | 1.05 | .012 | .28 | .009 | 1.47 | .51 | .25 | .45 | .09 | | Remainder. |
| 5 | .06 | 1.11 | .015 | .50 | .010 | 1.41 | .46 | .25 | .70 | <.01 | | Do. |
| 6 | .05 | 1.01 | .013 | .38 | .012 | 1.15 | .38 | .23 | .74 | .01 | | Do. |
| 7 | .06 | 1.29 | .007 | .37 | .008 | 1.11 | .17 | .24 | 1.05 | .17 | | Do. |
| 8 | .04 | .98 | .013 | .36 | .009 | 1.21 | .29 | .22 | .90 | <.01 | .025 | Do. |

The strength properties of the weldments formed of the weld metal shown in Table 2 are set forth in Table 3, as follows:

*Table 3*

| Welding Wire Example | Tensile Strength (p.s.i.) | Yield Strength, .2% Offset (p.s.i.) | Percent Elongation in 1.4 Inches | Percent Reduction in Area | Charpy V-Notch Impact Toughness (Impact Energy, ft.#) | | | |
|---|---|---|---|---|---|---|---|---|
| | | | | | Room Temp. | 0° F. | −60° F. | −100° F. |
| 4 | 105,250 | 85,825 | 22.5 | 57.2 | 68 | 54 | 37 | 23 |
| 5 | 116,500 | 96,000 | 20 | 55.3 | 59 | 50.5 | 35 | 27 |
| 6 | 106,975 | 90,275 | 21 | 56 | 61 | 50 | 39 | 29 |
| 7 | 102,500 | 89,000 | 20 | 54.4 | 54 | 48 | 36 | 30 |
| 8 | 100,375 | 90,000 | 23.5 | 58.9 | 74 | 50 | 34 | 17 |

The welded steel plates and weldments provided by the weld wires of Examples 4, 5 and 6 were heat treated by heating to 1650–1700° F. for four hours, quenching in water, and then again heating to 1150–1200° F. for four hours and quenching in water, following which the strength properties shown in Table 4 were found:

*Table 4*

| Welding Wire Example | Tensile Strength (p.s.i.) | Yield Strength, .2% Offset (p.s.i.) | Percent Elongation in 1.4 Inches | Percent Reduction in Area | Charpy V-Notch Impact Toughness (Impact Energy, ft.#) | | | |
|---|---|---|---|---|---|---|---|---|
| | | | | | Room Temp. | 0° F. | −60° F. | −100° F. |
| 4 | 92,750 | 80,250 | 23.5 | 65.7 | 87 | 69 | 43 | 19 |
| 5 | 92,250 | 81,000 | 24 | 42 | 92 | 82 | 54 | 42 |
| 6 | 94,500 | 83,500 | 23 | 64.5 | 76 | 62 | 41 | 24 |

Welding processes other than the submerged arc process may be used. For example, the shielded inert gas process facilitates automatic welding of high strength steel by the inventive welding wire. In that type of welding, slightly less manganese may be used in the welding wire since more of this element is lost in submerged arc welding than in inert gas welding. It is apparent from this example that the nature of the welding process must be considered in determining the precise composition of the welding wire within the limits stated herein. Further, electro-slag processes may be used to weld high strength steels with the low alloy welding wire, such processes including the use, for example, of a solid wire with a flux shield, a solid wire with an inert gas shield, and a flux cored wire with a gas shield.

It will be understood that the above-described embodiments of the invention are illustrative only and modifications thereof will occur to those skilled in the art. Therefore, the invention is not to be limited to the particular examples described herein but is to be defined by the appended claims.

We claim:

1. A low alloy steel welding wire for welding low alloy high strength steels, the welding wire consisting essentially of, by weight, about .15% maximum carbon, 1.2 to 1.8% manganese, .015% maximum phosphorus, .015% maximum sulphur, .8% maximum silicon, .5 to 1.2% nickel, .15% maximum chromium, .1 to .5% molybdenum, .4 to 1% copper, a deoxidizing agent consisting of at least one metal selected from the group consisting of zirconium, titanium, aluminum, magnesium and calcium, the deoxidizing agent, when aluminum, being present in the amount of .03 to .1%, no more than .1% aluminum being present alone or in combination with other members of the group, and the deoxidizing agent, when one of the other members of the group, being present in the amount of .03 to .5%, the deoxidizing agent, when consisting of a combination of the members of the group, not exceeding .5%, and the remainder being essentially iron.

2. A low alloy steel welding wire for welding low alloy high strength steels, the wire consisting essentially of, by weight, about .15% maximum carbon, 1.2 to 1.8% manganese, .015% maximum phosphorus, .015% maximum sulphur, .8% maximum silicon, .5 to 1.2% nickel, .15% maximum chromium, .1 to .5% molybdenum, .4 to 1% copper, .3% maximum copper in the form of a copper coating on the wire to prevent oxidation thereof, the combined quantities of copper being about 1.2% maximum, a deoxidizing agent consisting of at least one metal selected from the group consisting of zirconium, titanium, aluminum, magnesium and calcium, the deoxidizing agent, when aluminum, being present in the amount of .03 to .1%, no more than .1% aluminum being present alone or in combination with other members of the group, and the deoxidizing agent, when one of the other members of the group, being present in the amount of .03 to .5%, the deoxidizing agent, when consisting of a combination of the members of the group, not exceeding .5%, and the remainder being essentially iron.

3. A low alloy steel welding wire for welding low alloy high strength steels containing by weight about .15 to .3% carbon and 2 to 5% of other alloying elements, the wire consisting essentialy of, by weight, about .15% maximum carbon, 1.2 to 1.8% manganese, .015% maximum phosphorus, .015% maximum sulphur, .8% maximum silicon, .5 to 1.2% nickel, .15% maximum chromium, .1 to .5% molybdenum, .4 to 1% copper, a deoxidizing agent consisting of at least one metal selected from the group consisting of zirconium, titanium, aluminum, magnesium and calcium, the deoxidizing agent, when aluminum, being present in the amount of .03 to .1%, no more than .1% aluminum being present alone or in combination with other members of the group, and the deoxidizing agent, when one of the other members of the group, being present in the amount of .03 to .5%, the deoxidizing agent, when consisting of a combination of the members of the group, not exceeding .5%, and the remainder being essentially iron.

4. A low alloy steel welding wire for welding low alloy high strength steels containing by weight about .15 to .3% carbon and 2 to 5% of other alloying elements, the wire consisting essentially of, by weight, about .15% maximum carbon, 1.2 to 1.8% manganese, .015% maximum phosphorus, .015% maximum sulphur, .8% maximum silicon, .5 to 1.2% nickel, .15% maximum chromium, .1 to .5% molybdenum, .4 to 1% copper, .3% maximum copper in the form of a copper coating on the wire to prevent oxidation thereof, the combined quantities of copper being about 1.2% maximum, a deoxidizing agent consisting of at least one metal selected from the group consisting of zirconium, titanium, aluminum, magnesium and calcium, the deoxidizing agent when aluminum, being present in the amount of .03 to .1%, no more than .1% aluminum being present alone or in combination with other members of the group, and the deoxidizing agent, when one of the other members of the group, being present in the amount of .03 to .5%, the deoxidizing agent, when consisting of a combination of the members of the group, not exceeding .5%, and the remainder being essentially iron.

5. A low alloy steel welding wire for welding low alloy high strength steels containing by weight about .15 to .3% carbon and 2 to 5% of other alloying elements, the wire consisting essentially of, by weight, about .15% maximum carbon, 1.2 to 1.8% manganese, .015% maximum phosphorus, .015% maximum sulphur, .8% maximum silicon, .5 to 1.2% nickel, .15% maximum chromium, .1 to .5% molybdenum, .4 to 1% copper, .03 to .5% zirconium as a deoxidizing agent, and the remainder being essentially iron.

6. A low alloy steel welding wire for welding low alloy high strength steels containing by weight about .15 to .3% carbon and 2 to 5% of other alloying elements, the wire consisting essentially of, by weight, about .15% maximum carbon, 1.2 to 1.8% manganese, .015% maximum phosphorus, .015% maximum sulphur, .8% maximum silicon, .5 to 1.2% nickel, .15% maximum chromium, .1 to .5% molybdenum, .4 to 1% copper, .03 to .1% aluminum as a deoxidizing agent, and the remainder being essentially iron.

7. A low alloy steel welding wire for welding low alloy high strength steels containing by weight about .15 to .3% carbon and 2 to 5% of other alloying elements, the wire consisting essentially of, by weight, about .15% maximum carbon, 1.2 to 1.8% manganese, .015% maximum phosphorus, .015% maximum sulphur, .8% maximum silicon, .5 to 1.2% nickel, .15% maximum chromium, .1 to .5% molybdenum, .4 to 1% copper, .03 to .5% titanium as a deoxidizing agent, and the remainder being essentially iron.

8. A low alloy steel welding wire for welding low alloy high strength steels containing by weight about .15 to .3% carbon and 2 to 5% of other alloying elements, the wire consisting essentially of, by weight, about .15% maximum carbon, 1.2 to 1.8% manganese, .015% maximum phosphorus, .015% maximum sulphur, .8% maximum silicon, .5 to 1.2% nickel, .15% maximum chromium, .1 to .5% molybdenum, .4 to 1% copper, .03 to .5% of a deoxidizing agent consisting of a combination of .03 to .1% aluminum and .03 to .5% zirconium, and the remainder being essentially iron.

References Cited in the file of this patent

UNITED STATES PATENTS

| | | |
|---|---|---|
| 1,794,983 | Ritter | Mar. 3, 1931 |
| 2,140,237 | Leitner | Dec. 13, 1938 |
| 2,443,932 | Roff et al. | June 22, 1948 |
| 2,621,278 | Muller | Dec. 9, 1952 |

OTHER REFERENCES

Chipman: Transactions of ASM, volume 22, 1934, pages 385–446, particularly pages 430–432. Published by the American Society for Metals, Cleveland, Ohio.